June 8, 1965  J. W. CLARK  3,187,595
SELF-ADJUSTING PARKING BRAKE CONTROL MECHANISM
Filed Oct. 23, 1962  3 Sheets-Sheet 1

INVENTOR.
John W. Clark
BY
D.D. McGraw
His Attorney

June 8, 1965
J. W. CLARK
3,187,595
SELF-ADJUSTING PARKING BRAKE CONTROL MECHANISM
Filed Oct. 23, 1962
3 Sheets-Sheet 2
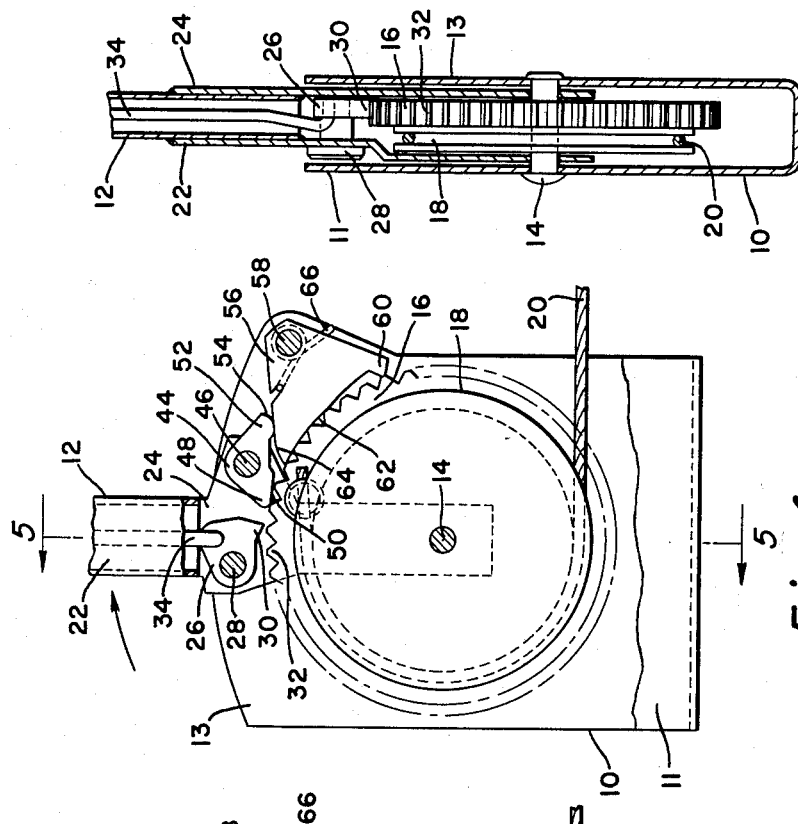
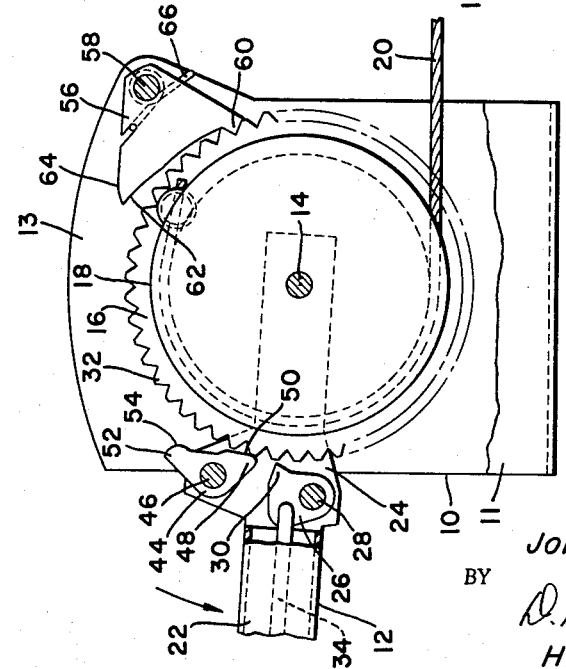
INVENTOR.
John W. Clark
BY
D. D. McGraw
His Attorney June 8, 1965   J. W. CLARK   3,187,595
SELF-ADJUSTING PARKING BRAKE CONTROL MECHANISM
Filed Oct. 23, 1962   3 Sheets-Sheet 3

INVENTOR.
John W. Clark
BY D. D. McGraw
His Attorney

United States Patent Office 3,187,595
Patented June 8, 1965

3,187,595
SELF-ADJUSTING PARKING BRAKE
CONTROL MECHANISM
John W. Clark, Birmingham, Mich., assignor to General Motors Corporation, Detroit, Mich., a corporation of Delaware
Filed Oct. 23, 1962, Ser. No. 232,363
13 Claims. (Cl. 74—156)

The invention relates to a control mechanism and more particularly to a parking brake control for vehicle parking brakes wherein the mechanism is self-adjusting during each cycle of operation.

Parking brakes on automotive vehicles are commonly provided as a mechanically actuated brake system which applies either the service brakes on the rear wheels or a separate brake shoe or band on part of the vehicle drive line which will have the effect of holding the rear wheels. Numerous mechanisms have been provided in the past for actuating the mechanical linkage for such brakes. It is common to actuate parking brakes by variably tensioning a cable leading to a suitable portion of the brake actuating mechanism. As the brake shoes wear, and the cable stretches, adjustments must be made in the parking brake controls so that full braking action may be obtained when desired.

A control mechanism embodying one aspect of the invention utilizes a positive brake actuating linkage to tension the parking brake cable and permits repeated brake applying operations as may be necessary until the parking brake is fully applied. The mechanism also permits controlled release of the parking brake from any position of brake application. One embodiment utilizes a hand operated brake handle which may, for example, be positioned to the left of the vehicle operator and arranged to occupy a position substantially parallel to the floor of the vehicle when not in use. The handle may also be moved to this position after the parking brake is applied and while the parking brake is fully engaged. The handle may also be moved upwardly and rearwardly by the vehicle operator to release the parking brake with substantially the same motion as that required to apply the brake. In order to accomplish these results the first embodiment of the mechanism includes an actuating pawl and a release pawl movable with the handle and a spring biased holding pawl mounted on a part of the control mechanism so as to engage a toothed gear sector and hold the brake cable in the desired tension. The actuating pawl may be rendered inoperative so that the release pawl engages the holding pawl and the frictional engagement of the gear sector is provided so as to permit controlled release of the gear sector under influence of tension in the cable when the holding pawl is removed from its locking position relative to the gear sector.

A second embodiment of the invention includes a somewhat different release means instead of the release pawl, and has the added feature of mechanism which prevents undesirable cable slack to be introduced upon brake release so that a full brake application may be obtained with one brake applying stroke of the handle.

In the drawings:

FIGURE 3 is a view similar to FIGURE 1 and shows the control mechanism with the operating handle in the storage position and the brake fully applied.

FIGURE 4 is a view similar to FIGURE 1 showing the control mechanism in the parking brake releasing position.

FIGURE 5 is a cross-section view of the mechanism taken in the direction of arrows 5—5 of FIGURE 4.

Figure 2:
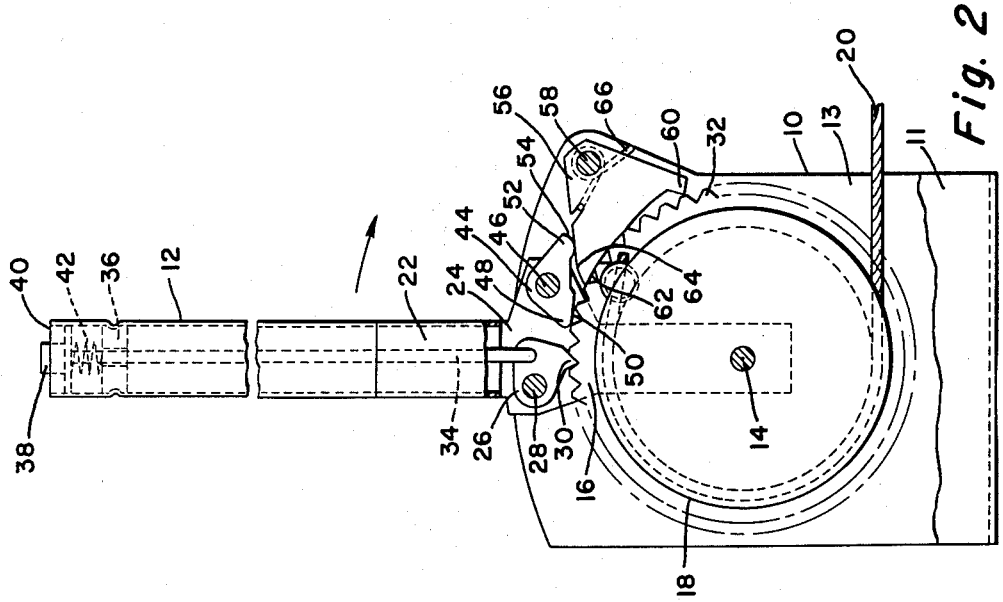
FIGURE 2 is similar to FIGURE 1 and shows the brake control mechanism during the brake application.

The control mechanism illustrated in FIGURES 1–5 of the drawings includes a bracket or mount 10 which may be suitably secured to a part of the vehicle body so that the operating handle 12 is available to the vehicle operator. In some installations it may be convenient to position bracket 10 beside the vehicle operator seat so that the handle 12 when at rest or storage position shown in FIGURE 3 is below the seat and does not interfere with the operator while entering or leaving the vehicle. Other suitable positions of the mechanism may also be provided. The handle 12 is pivotally secured to the sides 11 and 13 of the bracket 10 by a shaft 14 on which a gear sector 16 is also rotatably mounted. A pulley 18 is attached to the gear sector 16 and is rotatable therewith about shaft 14. The parking brake actuating cable 20 is secured to pulley 18 so as to be laid on and paid out from the pulley as the vehicle parking brakes are respectively applied and released.

Handle 12 includes side plates 22 and 24 through the ends of which shaft 14 extends. The portion of handle 12 which is gripped by the vehicle operator may be tubular in form and is secured to the side plates at points immediately above the upper ends of bracket sides 11 and 13. An actuating pawl 26 is pivotally mounted on and between the sides plates 22 and 24 by a pivot pin 28. Pawl 26 includes a pawl tooth 30 which is engageable with the gear teeth 32 of gear sector 16 so that as the handle is moved in the brake applying direction with the tooth 30 so engaged, tooth 30 is locked into engagement with teeth 32. A control rod 34 is secured to actuating pawl 26 and extends through the tubular section of handle 12. A suitable rod bearing 36 secured in the upper end of handle 12 guides the rod 34. Rod 34 has its upper end terminating in a button 38 extending above the upper end 40 of handle 12. Spring 42 acts against the bottom of button 38 and reacts against the upper surface of bearing 36 so as to urge the rod 34 upwardly in handle 12. This also urges actuating pawl 26 in the counterclockwise direction about pin 28 and holds pawl tooth 30 in the disengaged position illustrated in FIGURES 1, 3 and 4.

Sides plates 22 and 24 have sections between which a release pawl 44 is pivotally mounted on pivot pin 46. Release pawl 44 has a generally right triangular conformation with pin 46 extending through a portion of the triangle adjacent the right angle. The opposite ends of release pawl 44 comparable to the other two angles of the triangle are adjacent the outer ends of the teeth 32 of gear sector 16 and on opposite sides of the pin 46. Release pawl end 48 is generally rounded and has a lower surface 50 which acts as a friction bearing surface engaging the ends of teeth 32 of gear sector 16 under conditions and for the purposes to be described. The other end 52 of release pawl 44 is rounded to provide a cam bearing surface 54.

Figure 1:
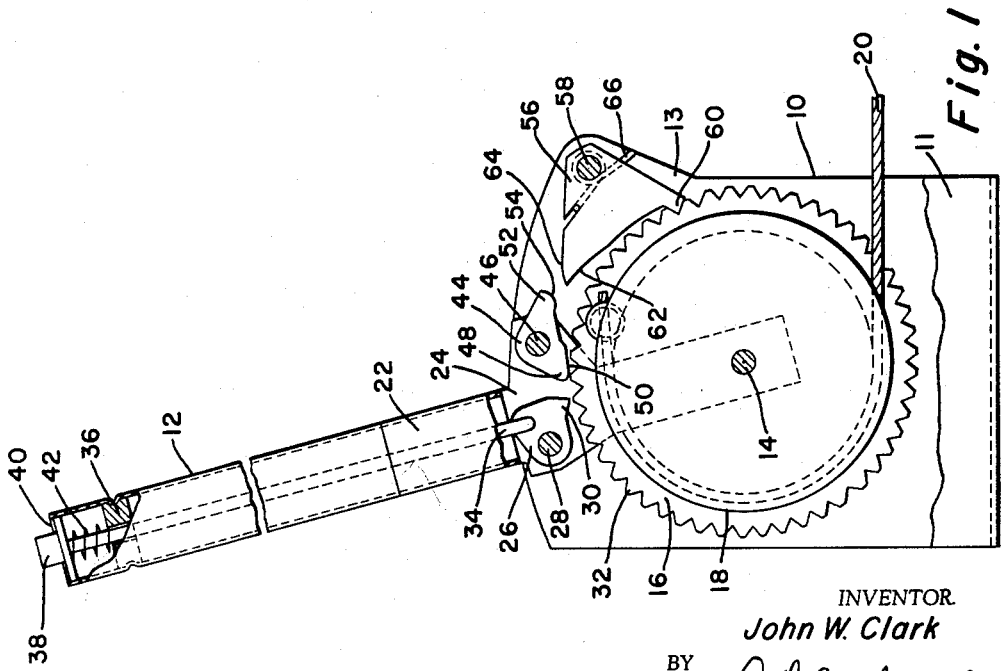
FIGURE 1 is a side elevation of a mechanism embodying the invention, with parts broken away and in section, and showing the mechanism when the brake is applied and before the operating handle has been completely returned to the storage position.

A holding pawl 56 is pivotally attached to and between the adjacent sides 11 and 13 of bracket 10 by pivot pin 58. Pawl 56 is also generally triangular in conformation with the angles of the triangle being more nearly equal than those of pawl 44. Pin 58 extends through one of the triangular ends and a holding pawl tooth 60 is formed on one of the other ends. Tooth 60 is positioned so as to engage gear teeth 32 and when so engaged to lock the gear sector 16 against counterclockwise rotation as seen in FIGURE 1. The counterclockwise rotation of gear sector 16 is the direction of rotation in which the tension is decreased in cable 20 to release the vehicle parking brakes. Thus tooth 60 holds the cable 20 in tension to the extent that gear sector 16 has been rotated clockwise by actuating pawl 26. The third end of pawl 56 has a lower surface 62 adjacent thereto which is frictionally engageable with the ends of gear teeth 32 when tooth 60 is disengaged from the gear teeth. The upper surface 64 adjacent the pawl third end is a cam bearing surface which is engageable with the bearing surface 54 of release pawl 44 when the release pawl is moved sufficiently toward pawl 56. A torsion spring 66 is suitably attached to pawl 56 and to a part of bracket 10 to urge the pawl in the clockwise direction about pin 58 to hold tooth 60 normally engaged with gear teeth 32 while permitting a ratchet action of teeth 32 and 60 when the gear sector 16 is rotated in the clockwise direction.

In operation the vehicle parking brakes are in the normally released position. The handle 12 therefore extends forwardly as illustrated in FIGURE 3. The brake cable 20 is insufficiently tensioned to apply the brakes. The gear sector 16 and the pulley 18 are therefore in approximately the position shown in FIGURE 1. Holding pawl 56 has its tooth 60 engaging gear teeth 32 but no appreciable holding action is required since the brakes are released. When the operator stops the vehicle and desires to energize the parking brake system, he grips handle 12 and at the same time presses button 38 inwardly against the force of spring 42. Control rod 34 is moved downwardly within the handle 12 and acts to pivot pawl 26 about pin 28 and engage pawl tooth 30 with gear teeth 32. The operator then moves the handle clockwise as seen in the figures. Since tooth 30 has a locking relation with teeth 32 and pivot pin 28, the operator is not required to hold the button 38 down so long as he is exerting a force on handle 12 tending to move it clockwise which is sufficient to generate the locking action to overcome the releasing effects of spring 42. In moving the handle clockwise with tooth 30 engaged with teeth 32, handle 12 rotates about the axis of shaft 14. Gear sector 16 and pulley 18 also rotate with it. At this time release pawl 44 performs no function. Since holding pawl 56 is engaged to prevent only counterclockwise rotation of gear sector 16, its tooth 60 ratchets with gear teeth 32 to permit clockwise rotation of the gear sector. The operator pulls the handle until the desired cable tension is obtained or until the handle is approximately vertical. If he has not previously released button 38 he does so and moves the handle counterclockwise as seen in the figures. Actuating pawl 26 is disengaged from gear sector 16 when the handle is no longer urged in the clockwise direction and spring 66 positions holding pawl 56 so that the holding pawl tooth 60 effectively locks gear sector 16 in the position to which it has been moved. The handle 12 may therefore be returned to the forward or generally horizontal position shown in FIGURE 3 and the brake cable 20 is held in tension applied to it by rotation of gear sector 16 and pulley 18. Under normal conditions of operation it may be required to move handle 12 and therefore gear sector 16 in the clockwise direction through an arc somewhat less than the 90° arc readily available in order to fully apply the parking brakes. It has been contemplated, for example, that a 15° arc would be sufficient under most circumstances. If, however, there is slack in the cable 20 to the extent that one clockwise arcuate movement of handle 12, within the limits of movement permitted due to the installation, is insufficient to sufficiently tension the cable 20, the cable may be further tightened. This is accomplished by releasing the actuating pawl at the end of the clockwise stroke as above described and then returning the handle to the forward position. Button 38 is again depressed to engage pawl tooth 30 with gear teeth 32 and handle 12 is again moved clockwise. Holding pawl tooth 60 again ratchets over gear teeth 32. When handle 12 is again moved counterclockwise with actuating pawl 26 released, holding pawl 56 again acts to hold gear sector 16 in its new clockwise rotated position. Cable 20 has therefore been additionally tensioned. It is obvious that this series of operations may be repeated any number of times until the cable 20 is sufficiently tensioned. When the parking brakes have been applied to the extent desired by the operator, he returns handle 12 to the forward position so that it is stored and does not interfere with access to the vehicle passenger compartment.

When it is desired to release the parking brake, the operator pulls handle 12 clockwise without engaging actuation pawl 26. This action is shown in FIGURE 4. The clockwise movement of handle 12 from the position shown in FIGURE 3 to that shown in FIGURE 4 has no effect on the brake setting until the bearing surface 54 of release pawl 44 engages the bearing surface 64 of holding pawl 56. The initial result of the engagement and continued movement of handle 12 is to pivot release pawl 44 about its pin 46 until its bearing surface 48 engages the ends of gear teeth 32. Further clockwise pivotal movement of pawl 44 is then prevented. As bearing surface 54 continues to ride up the cam bearing surface 64, holding pawl 56 is caused to pivot counterclockwise about pin 58 against the force of spring 66 to withdraw pawl tooth 60 from gear teeth 32. At the same time this action increases the frictional engaging force of release pawl bearing surface 50 with gear teeth 32. When the end of tooth 60 clears the ends of gear teeth 32 radially the frictional bearing surface 62 of pawl 56 also engages the ends of teeth 32 in frictional relation. At this point the only forces holding gear sector 16 against counterclockwise rotation are the frictional engaging forces between the ends of teeth 32 and surfaces 50 and 62. The tension in cable 20 will be constantly urging the gear sector 16 to rotate in the counterclockwise direction. The operator maintains enough force urging handle 12 clockwise to maintain the desired amount of frictional engaging force of surfaces 50 and 62 with the ends of gear teeth 32 to controllably release the parking brakes by controlling the counterclockwise rotation of gear sector 16. If the operator desires to entirely release the brake he permits gear sector 16 to rotate counterclockwise until this action takes place. If at any time he desires to halt the release of the parking brake he merely moves handle 12 counterclockwise, permitting holding pawl 56 to pivot clockwise under the force of spring 66 to re-engage the pawl tooth 60 with gear teeth 32 and lock the parking brakes in the new partially applied position. Whether the brakes are only partially or entirely released, in accordance with the operator's desires, the operator may return handle 12 to the forward or horizontal position shown in FIGURE 3.

Figure 7:
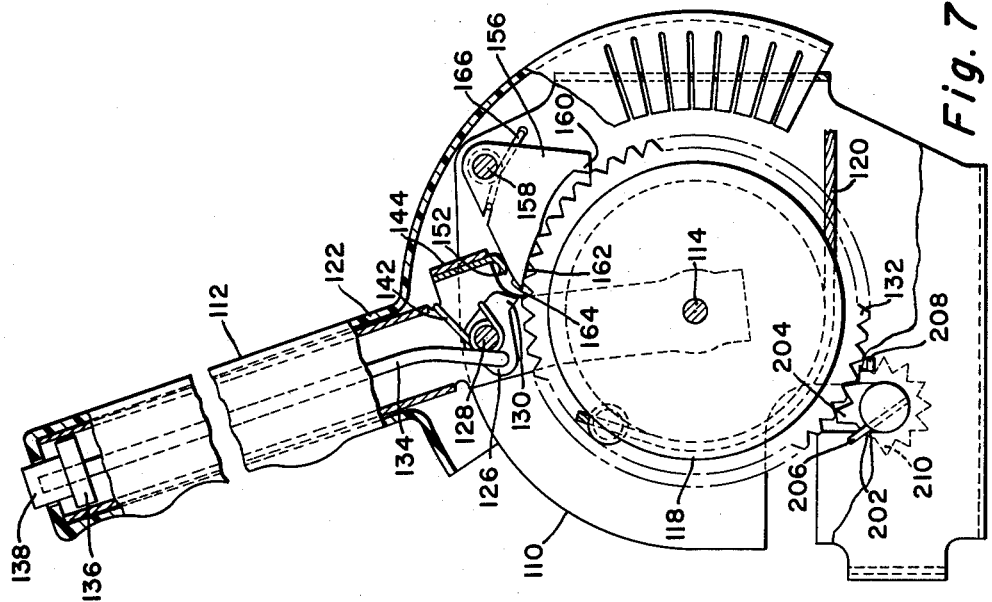
FIGURE 7 is a view similar to FIGURE 6 and shows the modified control mechanism at the completion of the parking brake releasing action.
Figure 6:
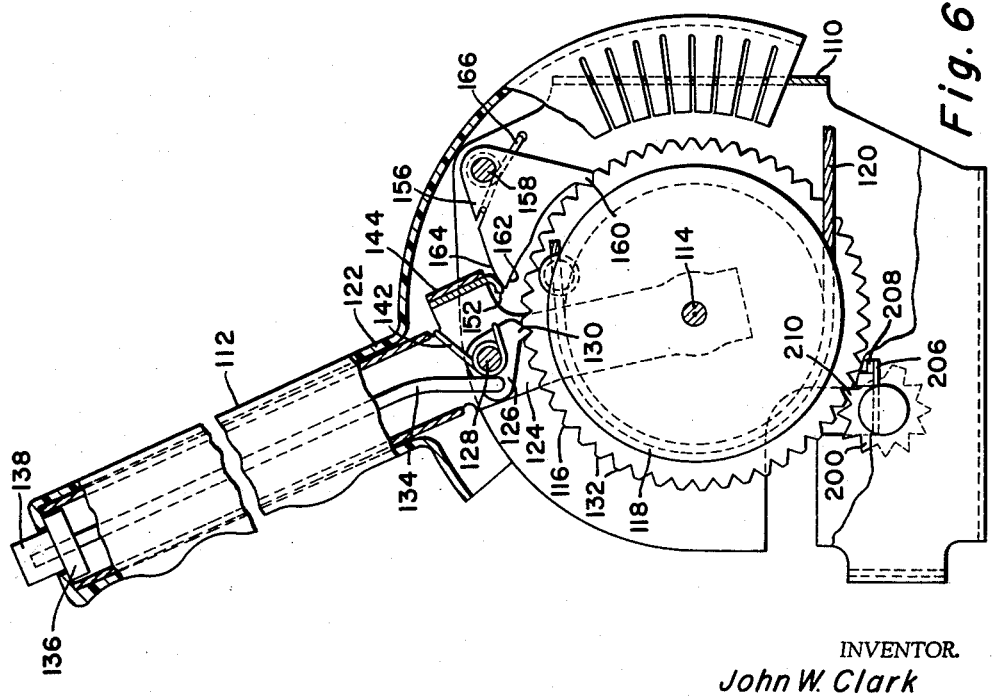
FIGURE 6 is a side elevation of a mechanism embodying a modification of the invention, with parts broken away and in section, and showing the mechanism when the brake is applied and before the operating handle has been completely returned to the storage position.

The modified mechanism illustrated in FIGURES 6 and 7 includes the bracket or mount 110 suitably secured to the vehicle so that the operating handle 112 is available to the vehicle operator. Handle 112 is pivotally secured to the bracket 110 by the shaft 114 on which the gear sector 116 is also rotatably mounted. The pulley 118 is attached to or formed as a part of the gear sector 116 and is rotatable therewith about shaft 114. The parking brake actuating cable 120 is secured to pulley 118 so that it operates in the same manner as in the mechanism of FIGURE 1. Handle 112 includes the plastic grip and gear cover 122 and the plate 124, the upper end of which is formed as a tube or a channel so that it is received within the grip portion of the plastic member 122.

An actuating pawl 126 is pivotally mounted to plate 124 by pivot pin 128. Pawl 126 includes a pawl tooth 130 which is engageable with gear teeth 132 of gear sector 116 so that as the handle is moved in the brake apply direction (clockwise as seen in FIGURES 6 and 7) with the tooth 130 so engaged, that tooth is locked into engagement with teeth 132. A control rod 134 is secured to the actuating pawl 126 and extends through the upper end of handle 112. A suitable stop 136 and button 138 are provided at the upper end of rod 134 so that the stop is contained within the grip portion of the handle 112 to limit outward movement of rod 134 and button 138 extends out of the end of the handle. A torsion spring 142 is wrapped about pivot pin 128 and has its ends respectively engaging the plate 124 and one side of pawl 126 so that it urges the pawl tooth 130 into engagement with gear teeth 132 and also urges rod 134 upwardly with stop 136 engaging the end of the handle grip. When the operator presses downwardly on button 138 against the force of spring 142, pawl tooth 130 is disengaged from gear sector 116.

A tab 144 formed on plate 124 adjacent pawl 126 is provided with a projection 152. This projection is a release mechanism and is engageable in camming relation with the upper surface 164 of the holding pawl 156 which is pivotally attached to the adjacent sides of the mounting bracket 110 by pivot pin 158. Pawl 156 is shaped similar to pawl 56 of the mechanism illustrated in FIGURE 1. It is provided with a holding pawl tooth 160 formed on one triangular end and positioned so as to engage gear teeth 32 and when so engaged to lock the gear sector 116 against counterclockwise rotation, as seen in FIGURE 6. The counterclockwise rotation of the gear 116 is the direction of rotation in which the tension is decreased in cable 120 to release the vehicle parking brakes. Thus, tooth 160 holds the cable 120 in tension to the extent that gear sector 116 has been rotated clockwise by actuating pawl 126.

The other triangular end of pawl 156 has a lower surface 162 adjacent thereto which is frictionally engageable with the ends of gear teeth 132 when tooth 160 is disengaged from the gear teeth. When the upper surface 164 of pawl 156 is engaged by the cam bearing end of projection 152 upon clockwise movement of the handle 112, further movement of the handle in that direction cams pawl 156 to rotate it counterclockwise and disengage tooth 160 from gear teeth 132. A torsion spring 166 is suitably attached to pawl 156 and to a part of bracket 110 to urge the pawl in the clockwise direction about pin 158 to hold tooth 160 normally engaged with gear teeth 132 while permitting a ratchet action of the teeth 132 and 160 when the gear sector 116 is rotated in the clockwise direction.

An anti-backlash gear 200 is also provided. This gear has a space 202 from which one tooth is missing, and has an extra wide tooth 204 adjacent space 202. A leaf spring 206 is provided on the gear which is engageable with a tab 208 struck from the support bracket 110 so that the spring urges gear 200 into meshing engagement with the gear 116 when the spring is flexed against the tab. This gear is provided to allow the brake to be released only to a limited maximum amount. Thus, it is impossible for the brake cable to have more than a predetermined amount of slack due to adjustment of the control mechanism by the operator. Gear 200 meshes with teeth 132 and when the brake is applied, gear 200 is rotated counterclockwise by clockwise movement of gear 116 until the missing tooth space 202 is positioned at the mesh point. Further clockwise rotation of gear 116 merely moves the gear teeth 132 past gear 200 without additionally rotating gear 200. The action of spring 206 permits this ratchet effect. When the brake is released, gear 200 is rotated clockwise by spring 206 until its first tooth 210 adjacent the missing tooth space 202 is picked up by one of the gear teeth 132. Gear 200 then continues to rotate clockwise with the counterclockwise brake releasing movement of gear 116 until the wide tooth 204 wedges in the gear sector 116 as shown in FIGURE 7. This prohibits further brake releasing movement of gear 116 and therefore limits the amount of brake cable release to the angular distance moved by gear 116 for rotation of gear 200 in the manner described. This provides constant brake release cable tension and insures full application of the parking brake with less than one complete stroke of the handle 112.

A parking brake control mechanism has been disclosed which is self-adjusting, is positive in action to lock and release the parking brakes, and permits controlled release of the brakes. The control mechanism also permits storage of the operating handle out of the way of the vehicle operator when not in use, whether the brakes are applied or released.

I claim:

1. A vehicle parking brake control mechanism comprising, a toothed gear sector, actuating pawl means manually engageable with said gear sector to rotate said gear sector to apply a vehicle parking brake, a holding pawl having a tooth normally ratchet-engaging said gear sector and preventing said gear sector from rotating to release the vehicle parking brake, release pawl means movable with said actuating pawl means in the brake apply direction to engage and move and retain said holding pawl out of holding relation with said gear sector, means for disengaging said actuating pawl means from said gear sector, and means frictionally engaging said gear sector and providing controlled vehicle parking brake releasing rotation of said gear sector when said release pawl means is retaining said holding pawl tooth out of holding relation with said gear sector.

2. The control mechanism of claim 1, further comprising an operating handle pivotally movable in arcuate strokes about the axis of rotation of said gear sector, said actuating pawl means and said release pawl means being pivotally mounted on said handle.

3. The control mechanism of claim 2, said release pawl means engaging said holding pawl substantially at the end of a pivotal movement stroke of said handle.

4. The control mechanism of claim 1, said means frictionally engaging said gear sector comprising a friction surface formed on said holding pawl and held in engagement with said gear sector by said release pawl means.

5. The control mechanism of claim 1, said means frictionally engaging said gear sector comprising a friction surface formed on said release pawl means and held in engagement with said gear sector by said holding pawl.

6. A control mechanism for controllably rotating a gear sector through a desired arc in one direction and permitting controlled rotation of the gear sector in the opposite direction, said control mechanism comprising, a frame, a gear sector to be controlled rotatably mounted on said frame, a handle mounted on said frame for arcuate movement about the axis of rotation of said gear sector, a first pawl pivotally mounted on said handle and having a tooth engageable with said gear sector, a spring biased pawl control rod extending through said handle and biased to hold said first pawl tooth in the disengaged position, a second pawl pivotally mounted on said handle in arcuate spaced relation from said first pawl and having a cam bearing end and a friction bearing end, said friction bearing end being engageable with said gear sector, a third pawl pivotally mounted on said frame and having a tooth lockingly engageable with said gear sector to prevent gear sector rotation in only one direction of rotation, a spring acting on said third pawl and said frame urging said third pawl tooth into engagement with said gear sector, said third pawl having a cam surface engageable with said second pawl cam bearing end upon arcuate movement of said handle toward said third pawl and a friction bearing surface engageable with said gear sector when said third pawl tooth is disengaged from said gear sector, said first pawl control rod being movable to engage said first pawl tooth with said gear sector and said handle then being rotatable to rotate said gear sector with said third pawl tooth ratcheting to permit that rotation and engaging said gear sector to prevent reverse rotation of said gear sector, said control rod being movable to release said first pawl tooth from said gear sector and permit reverse rotation of said handle while said third pawl holds said gear sector against reverse rotation, said second pawl being arcuately movable by rotation of said handle toward said third pawl with said first pawl disengaged from said gear sector to engage said second pawl cam bearing end with said third pawl cam surface to pivot said second pawl to engage said second pawl friction bearing end with said gear sector and then upon further movement of said handle toward said third pawl to pivot said third pawl against said third pawl spring to disengage said third pawl tooth from said gear sector and engage said third pawl friction bearing surface with said gear sector, said friction bearing surfaces thereby permitting controlled reverse rotation of said gear sector.

7. A vehicle parking brake control mechanism comprising, a bracket, a pulley shaft, a pulley rotatably mounted on said bracket by said shaft and having a tensionable parking brake cable secured thereto, a gear sector secured to rotate said pulley and having a plurality of gear teeth thereon, a pivotable holding pawl mounted on said bracket and having a tooth lockingly engageable with said gear sector to hold said pulley and therefore said cable in tension to maintain application of the parking brake, said holding pawl having a spring urging said pawl in a pivoted direction to keep said holding pawl tooth engaged with said gear sector and having a gear tooth-end engaging surface frictionally engageable with the ends of the teeth on said gear sector when said holding pawl tooth is disengaged, an operating handle pivotally movable about said pulley shaft, an actuating pawl pivotally secured to said handle and having an actuating tooth engageable with said gear sector to rotate said gear sector toward said holding pawl, means for manually engaging said actuating pawl tooth with said gear sector, means for disengaging said actuating pawl tooth therefrom, and a release pawl freely pivotally mounted on said operating handle and having one end engageable with said holding pawl in a camming action to move said holding pawl tooth to disengage said gear sector and to move said holding pawl tooth-end engaging surface to frictionally engage ends of said gear sector teeth, said release pawl having a gear sector tooth-end engaging surface forced into engagement with ends of said gear sector teeth by pivotal movement of said releasing pawl during camming action thereof against said holding pawl whereby said tooth-end engagement surfaces of said pawls provide a release limiting force to said tensioned cable through said gear sector and said pulley.

8. A vehicle parking brake control mechanism comprising, a toothed gear sector, actuating pawl means engageable with said gear sector to rotate said gear sector to apply a vehicle parking brake, a holding pawl having a tooth normally ratchet-engaging said gear sector and preventing said gear sector from rotating to release the vehicle parking brake, release means movable with said actuating pawl means in the brake apply direction to engage and move and retain said holding pawl tooth out of holding relation with said gear sector, means for selectively disengaging said actuating pawl means from said gear sector, and means frictionally engaging said gear sector and providing controlled vehicle parking brake release rotation of said gear sector when said release means is retaining said holding pawl tooth out of holding relation with said gear sector, and said actuating pawl means is disengaged from said gear sector.

9. The control mechanism of claim 8, further comprising an operating handle pivotally movable in arcuate strokes about the axis of rotation of said gear sector, said actuating pawl means and said release means being mounted on said handle.

10. The control mechanism of claim 9, said release means being angularly located on said handle to engage said holding pawl substantially at the end of a pivotal movement stroke of said handle.

11. The control mechanism of claim 8, said means frictionally engaging said gear sector comprising a friction surface formed on said holding pawl and held in engagement with said gear sector by said release means.

12. The mechanism of claim 8, further comprising an anti-backlash gear meshingly engaging said gear sector and rotated thereby a predetermined maximum arcuate distance while said sector is rotating to apply the parking brake and having means blocking further brake releasing rotation of said gear sector upon sector rotation through an arcuate distance necessary to return said anti-backlash gear through a reversely rotated arcuate distance equal to said predetermined maximum arcuate distance.

13. A control mechanism for controllably rotating a gear sector through a desired arc in one direction and permitting controlled rotation of the gear sector in the opposite direction, said control mechanism comprising, a frame, a gear sector to be controlled rotatably mounted on said frame, a handle mounted on said frame for arcuate movement about the axis of rotation of said gear sector, a first pawl pivotally mounted on said handle and having a tooth engageable with said gear sector, a pawl control rod extending through said handle and attached to said first pawl, a spring engaging said first pawl and biased to hold said first pawl tooth in the gear sector engaged position, a projection on said handle in arcuate spaced relation from said first pawl and having a cam bearing end, a second pawl pivotally mounted on said frame and having a tooth lockingly engageable with said gear sector to prevent gear sector rotation in only one direction of rotation, a spring acting on said second pawl and said frame urging said second pawl tooth into engagement with said gear sector, said second pawl having a cam surface engageable with said projection cam bearing end upon arcuate movement of said handle toward said second pawl and a friction bearing surface engageable with said gear sector when said second pawl tooth is disengaged from said gear sector, said handle being rotatable with said first pawl tooth engaging said gear sector and to rotate said gear sector with said second pawl tooth ratcheting to permit that rotation and engaging said gear sector to prevent reverse rotation of said gear sector, said control rod being movable to release said first pawl tooth from said gear sector and permit reverse rotation of said handle while said second pawl holds said gear sector against reverse rotation, said projection being arcuately movable by rotation of said handle toward said second pawl with said first pawl disengaged from said gear sector to engage said projection cam bearing end with said second pawl cam surface to pivot said second pawl against said second pawl spring to disengage said second pawl tooth from said gear sector and engage said second pawl friction bearing surface with said gear sector, said friction bearing surface thereby permitting controlled reverse rotation of said gear sector.

References Cited by the Examiner

UNITED STATES PATENTS

| | | | |
|---|---|---|---|
| 1,904,178 | 4/33 | Vaughn | 74—154 |
| 2,890,857 | 6/59 | Hoffman | 74—155 X |
| 2,927,771 | 3/60 | Clark | 74—155 X |
| 2,970,490 | 2/61 | Winland | 74—142 |

BROUGHTON G. DURHAM, *Primary Examiner.*